United States Patent Office 3,178,472
Patented Apr. 13, 1965

3,178,472
PREPARATION OF OPTICALLY ACTIVE NATURALLY OCCURRING N-MONOMETHYL-AMINO CARBOXYLIC ACIDS
Joseph Hellerbach and Peter Quitt, Basel, and Karl Vogler, Riehen, Switzerland, assignors to Hoffmann-La Roche Inc., Nutley, N.J., a corporation of New Jersey
No Drawing. Filed Apr. 5, 1962, Ser. No. 185,207
Claims priority, application Switzerland, Apr. 13, 1961, 4,385/61; Sept. 25, 1961, 11,110/61
8 Claims. (Cl. 260—518)

The present invention relates to a method for the preparation of optically active N-monomethylamino carboxylic acids. Optically inactive, for example racemic N-monomethylamino carboxylic acids can be prepared without any particular difficulty. Until now, however, there has not been available satisfactory technically useful syntheses for optically active N-monomethylamino carboxylic acids. The methods presently known suffer from the fact that in preparing the desired optical antipodes there has also been obtained, at least in part, racemic product.

The method of the instant invention now makes possible the N-methylation of optically active amino carboxylic acids with preservation of their optical activity. The present method is characterized in that one reacts, in aqueous solution, the salt formed from a strong base and an optically active amino carboxylic acid with benzaldehyde or a substituted benzaldehyde to form an N-benzylidine compound which is reduced to the corresponding N-benzyl compound which is then N-methylated, and subsequently the N-benzyl group is split off by hydrogenolysis.

As amino carboxylic acids which can be converted by the method of this invention into their N-monomethyl derivatives there can be used optically active naturally occurring amino acids, for example naturally occurring α-amino acids. As exemplary starting material amino carboxylic acids the following can be named: alanine, phenylalanine, serine, cysteine, cystine, tyrosine, tryptophan, histidine, methionine, valine, norvaline, leucine, isoleucine, arginine, ornithine, lysine, aspartic acid, glutaminic acid, threonine, α,γ-diaminobutyric acid, and the like. When the starting material aminocarboxylic acid contains two amino groups such as in, for example, lysine, ornithine or α,γ-diaminobutyric acid, then according to the method of this invention there can be obtained a product which either in only one or in both of the amino groups is methylated. If a strictly selective N-methylation of only one of the amino groups is desired, then it is advantageous to protect the amino group which is not to be methylated. For example, according to one expedient the not-to-be methylated amino group is protected by a carbobenzoxy residue which can be split off following the methylation to yield the free amino group.

In the first step of the method of the invention, a salt obtained from an optically active amino carboxylic acid and a strong base is reacted in aqueous solution with benzaldehyde or a substituted benzaldehyde, and the so-obtained benzaldehyde derivative is reduced to the corresponding N-benzyl compound. Through this reaction the optical activity of the starting material amino carboxylic acid is preserved. Salts especially suitable for this reaction are those formed by a reaction of the optically active amino carboxylic acid with an aqueous solution of an alkali or alkaline earth metal hydroxide, whereby there are obtained alkali or earth alkali metal salts such as sodium, potassium or calcium salts. The starting material amino carboxylic acids can be either levo- or dextro-rotatory. As substituted benzaldehydes there can be named, for example, salicylaldehyde, tolualdehyde, valillin, nitrobenzaldehyde, such as p-nitrobenzaldehyde, and the like.

The reduction of the so-formed N-benzaldehyde compound can be conducted by means of catalytically activated hydrogen or by means of a complex metal hydride, especially sodium borohydride. The last named embodiment shows special suitability in many cases, especially those involving the reduction of a sulfur containing product. As catalysts for the catalytic hydrogenation, palladium and platinum catalysts are suitable. Especially advantageous is the use of a palladium catalyst. The catalytic hydrogenation can be conducted at both atmospheric and elevated pressure. Suitably the hydrogenation is conducted in aqueous alkaline solution at room temperature.

According to a prefered embodiment of the invention, the optically active amino carboxylic acid employed as a starting material is dissolved in approximately 2 N sodium hydroxide and an equimolar amount of the benzaldehyde added to the solution with stirring at room temperature. After a homogeneous reaction mixture is obtained, the so-formed benzylidene compound is hydrogenated in situ, for example, catalytically by adding a hydrogenation catalyst such as 10% palladium-carbon and by introducing hydrogen into the reaction mixture, or by adding a complex metal hydride, preferably sodium borohydride. Suitably the temperature of the reaction mixture is maintained below about 20°. In order to increase the yields, it is also advisable to add to the reaction mixture after the addition of the complex metal hydride, further amounts of the benzaldehyde, and thereafter additional metal hydride. The so-formed N-benzyl compound can be precipitated as a rule by acidification of the reaction mixture, for example with approximately 1 N hydrochloric acid to a pH of about 6. Further purification of the so-obtained product is in most cases unnecessary.

In the second step of the method of this invention, the so-obtained optically active N-benzyl compound is methylated on the nitrogen atom of the benzylated amino group. This N-methylation can be conducted according to methods known per se, for example, via reaction of the N-benzyl compound with a methyl halide such as methyl iodide, or with dimethyl sulfate. It is especially suitable to effect the reductive methylation by means of formaldehyde. As reducing agents, there can be used hydrogen in the presence of a hydrogenation catalyst such as palladium-carbon, or preferably formic acid. Thus, for example a mixture of the N-benzyl compound, formic acid and formaldehyde solution can be heated, preferably to a temperature of about 100°, for a period of about one half to about four hours.

In the third step of the method of the invention, the so-obtained N-benzyl-N-methyl compound is subjected to hydrogenolysis for the purpose of splitting off the N-benzyl group, suitably by means of catalytically activated hydrogen in the presence of a solvent. According to one preferred embodiment, palladium-carbon is used as the catalyst and glacial acetic acid is used as the solvent, and the hydrogenolysis is conducted at about room temperature and atmospheric pressure. Besides palladium, there can also be used as the catalyst other hydrogenation catalysts such as platinum oxide, Raney nickel, or the like. The hydrogenolysis can also be effected by means of sodium in liquid ammonia.

The optically active N-monomethylaminocarboxylic acids which are obtained by the method of this invention are useful in the synthesis of peptide antibiotics, such as staphylomycin, etamycin, the enniatins and actinomycins. Actinomycin $C_3$, for instance, containing N-monomethylated L-valine has already been obtained synthetically.

The following examples are illustrative but not limitative of this invention. All temperatures are stated in degrees centigrade.

EXAMPLE 1

(a) *N-benzyl-L-valine.*—23.4 g. of L-valine was dissolved in 100 ml. of 2 N sodium hydroxide and the resulting solution mixed while stirring with 20.2 ml. of benzaldehyde. After about 15 minutes, the so-obtained homogeneous solution was mixed with 3 g. of 10% palladium-carbon and hydrogenated at room temperature and atmospheric pressure. After the hydrogen absorption stopped, the reaction mixture was filtered and the filtrate, while stirring, adjusted to pH 6 with 1 N hydrochloric acid, whereupon N-benzyl-L-valine precipitated: yield 35.2 g.; $[\alpha]_D^{21} = +24.7°$ (c.=1.0; 6 N HCl); M.P. 275° (dec.).

N-benzyl-L-valine could also be prepared by the following method: 11.7 g. of L-valine was dissolved in 50 ml. of 2 N sodium hydroxide, mixed with 10.1 ml. of benzaldehyde, and the reaction mixture then stirred until homogeneous, which took about 15 minutes. 1.14 g. of sodium borohydride was then added thereto in small portions with stirring so that the temperature did not rise over 20°. After 1 hour, a further 10.1 ml. of benzaldehyde and 1.14 g. of sodium borohydride was, in the same manner, added to the reaction mixture and, after a further two hours, the reaction mixture was washed with ether and then adjusted under strong agitation to pH 6 with 1 N hydrochloric acid, whereupon N-benzyl-L-valine precipitated: yield 17.8 g.; $[\alpha]_D^{21} = +24.9°$ (c.=1.0; 6 N HCl).

(b) *N-benzyl-N-methyl-L-valine.*—104 g. of N-benzyl-L-valine in finely powdered form was placed in a flask and covered with a mixture of 56 ml. of formic acid and 50 ml. of 38% formaldehyde solution, and the resulting mixture then heated to 100°. The reaction mixture soon formed into a heavy foam. The temperature of the reaction mixture was held at 100° for about 4 hours, whereby almost complete solution was obtained. The reaction mixture was then permitted to stand at room temperature for about 12 hours and then concentrated in vacuo at 60°. The so-obtained solid residue was dissolved in 1000 ml. of water and the resulting solution adjusted to pH 6 with solid barium carbonate. The solution was filtered and then concentrated to dryness in vacuco. The residue was boiled with acetone (in all 1.2 l), the solution cooled down and 90 g. of N-benzyl-N-methyl-L-valine crystallized from cold acetone. The crystals were filtered off and melted at 155° Via concentration of the mother liquors to 150 ml. there was obtained a further crop of 11.6 g. of product which melted at 153–155°. The substance sublimed in a high vacuum at 100°; $[\alpha]_D^{21} = +25.9°$ (c.=1.0; 6 N HCl).

(c) *N-methyl-L-valine.*—16.4 g. of N-benzyl-N-methyl-L-valine was dissolved in 200 ml. of acetic acid and hydrogenolyzed with 2 g. of palladium-carbon (10%) at 737 mm. Hg and 22°. After the absorption of 1960 ml. of hydrogen (theoretical amount 1850 ml.) the catalyst was filtered off and the filtrate concentrated in vacuo. The crystalline residue was taken up in 150 ml. of boiling ethanol (or methanol) and carefully mixed with water while still hot until solution was obtained. Upon cooling there was obtained a first crystalline fraction of 5.0 g., and from the mother liquors a second crop of 2.3 g. of N-methyl-L-valine. Both of these fractions exhibited a rotation of $[\alpha]_D^{23} = +33.7°$ (c.=1.0; 6 N HCl). The practically pure N-methyl-L-valine obtained as the residue from evaporation of the mother liquor exhibited a rotation of $[\alpha]_D^{23} = +32.2°$ (c.=1.0; 6 N HCl). Chromatographically both the crystalline fraction and the residue were identical and exhibited the same $R_f$ value.

N-methyl-L-valine did not melt up to 300° (sublimation occurred at over 150°).

EXAMPLE 2

(a) *N-benzyl-L-phenylalanine.*—16.52 g. of L-phenylalanine was dissolved in 50 ml. of 2 N sodium hydroxide and stirred with 10.1 ml. of freshly distilled benzaldehyde until a homogeneous solution resulted (about 10 minutes). Then 1.14 g. of sodium borohydride was added thereto in small portions with stirring so the temperature did not exceed 20°. After 1 hour, and in the same manner, a further 10.1 ml. of benzaldehyde and 1.14 g. of sodium borohydride was added to the reaction mixture. After a further 2 hours, the reaction mixture was washed with ether in order to remove the formed benzyl alcohol, and then adjusted to pH 6–7 with 1 N hydrochloric acid. It was then permitted to stand for one hour at 0°, filtered and the so-obtained N-benzyl-L-phenylalanine crystallized from dimethylformamide. Yield 22.8 g.; M.P. 250° (dec.); $[\alpha]_D^{22} = +34.8°$ (c.=0.5; 6N HCl);

$$[\alpha]_D^{21} = +21.4° \ (c.=1.0; \ 0.2 \ N \ NaOH)$$

(b) *N-benzyl-N-methyl-L-phenylalanine.*—12.8 g. of N-benzyl-L-phenylalanine in finely powdered form was covered with 5.6 ml. of formic acid and 5 ml. of 38% formaldehyde solution. Thereafter the mixture was heated to 100° and mixed with a further 5.6 ml. of formic acid and 5 ml. of formaldehyde solution, whereupon gas evolution appeared. After two hours heating, both reagents in the same amounts were added to the reaction mixture for a third time, and the reaction mixture maintained for a further two hours at 100° and finally for 16 hours at room temperature. The reaction mixture was then concentrated in vacuo at 60° and the residue dissolved in boiling water. After cooling, the obtained crystals were filtered off with suction and dried, yielding 12.7 g. of N - benzyl - N - methyl-L-phenylalanine which could be recrystallized from dimethylformamide, M.P. 220–222° (dec.)

(c) *N-methyl-L-phenylalanine.*—10.5 g. of N-benzyl-N-methyl-L-phenylalanine was taken up in 150 ml. of acetic acid and via addition of 45 ml. of 0.87 N perchloric acid (in acetic acid) brought into solution. Then 1.4 g. of palladium-carbon (10%) was quickly added and the resulting mixture hydrogenolyzed at 20° and 745 mm. Hg. Upon termination of the hydrogen absorption the reaction mixture was filtered, the filtrate concentrated in vacuo, the residue dissolved in 100 ml. of water and the solution neutralized with saturated sodium bicarbonate solution. The precipitated N-methyl-L-phenylalanine was filtered off with suction and recrystallized from water. Yield 5.2 g.; $[\alpha]_D^{21} = +26.4°$ (c.=1.0; 6 N HCl); $[\alpha]_D^{22} = +49.3°$ (c.=1.0; 1 N NaOH); M.P. 260° (dec.).

EXAMPLE 3

(a) *N-benzyl-L-alanine.*—Via reaction of L-alanine with benzaldehyde and reduction of the so-obtained benzylidene compound with sodium borohydride according to the procedure of the preceding examples, N-benzyl-L-alanine was obtained in a yield of 71%; M.P. 255° (dec.) $[\alpha]_D^{22} = +12.6°$ (c.=1.0; 6 N HCl).

(b) *N-benzyl-N-methyl-L-alanine.*—Via methylation of N-benzyl-L-alanine with formaldehyde in the presence of formic acid according to the procedure of the preceding examples, N-benzyl-N-methyl-L-alanine was obtained in a yield of 68%, M.P. 188° (from methanol/ether after sublimation in a high vacuum). $[\alpha]_D^{22} = -5.17°$ (c.=1.0; 6 N HCl).

(c) *N-methyl-L-alanine.*—N-benzyl-N-methyl - L - alanine was hydrogenolyzed by the procedure described in the previous examples in the presence of palladium-carbon giving a yield of 71% of N-methyl-L-alanine, M.P. 270° (dec.; from methanol/ether);

$$[\alpha]_D^{21} = +9.0° \ (c.=1.0; \ 6 \ N \ HCl)$$

EXAMPLE 4

(a) *N-benzyl-L-leucine.*—By the method described in the previous examples L-leucine was reacted with benzaldehyde and the reaction product reduced with sodium borohydride to N-benzyl-L-leucine which was obtained in a yield of 84; M.P. 255° (dec.);

$[\alpha]_D^{21} = +14.6°$ (c.=1.0; 6 N HCl)

(b) *N-benzyl-N-methyl-L-leucine.*—By the method described in the previous examples N-benzyl-L-leucine was methylated with formaldehyde in the presence of formic acid giving a yield of 74% of N-benzyl-N-methyl-L-leucine, M.P. 184–185° (from acetone/water);

$[\alpha]_D^{21} = +14.6°$ (c.=1.0; 6 N HCl)

(c) *N-methyl-L-leucine.*—Via hydrogenolytic splitting off of the N-benzyl group according to the method described in the previous examples, there was obtained from N-benzyl-N-methyl-L-leucine in a yield of 86%, N-methyl-L-leucine $[\alpha]_D^{21} = +30.5°$ (c.=1.0; 6 N HCl). The substance did not melt at up to 300°. It sublimed in a high vacuum at 200°.

EXAMPLE 5

(a) *N-benzyl-L-serine.*—L-serine was reacted, via the method described in the previous examples, with benzaldehyde, and the reaction product reduced to N-benzyl-L-serine with sodium borohydride. Yield 74%, M. P. 240° (dec.). $[\alpha]_D^{21} = +15.4°$ (c.=1.0; 6 N HCl).

(b) *N-methyl-L-serine.*—N-benzyl-L-serine was reductively methylated, via the method described in the previous examples, by means of formic acid and formaldehyde. Upon concentration of the reaction mixture in vacuo, an oil was obtained which, according to the procedure of the previous examples, was subjected to hydrogenolysis whereby the N-benzyl group was split off giving N-methyl-L-serine in a yield of 28% (based on N-benzyl-L-serine), M.P. 190° (dec.).

$[\alpha]_D^{21} = +30.5°$ (c.=1.0; 6 N HCl)

EXAMPLE 6

(a) $N^\epsilon$-*carbobenzoxy - $N^\alpha$-benzyl-L-lysine.*—According to the method described in the previous examples, $N^\epsilon$-carbobenzoxy-L-lysine was reacted with benzaldehyde and the reaction product reduced with sodium borohydride to give a yield of 70% of $N^\epsilon$-carbobenzoxy-$N^\alpha$-benzyl-L-lysine, M.P. 225° (dec.). $[\alpha]_D^{21} = +26.4°$ (c.=1.0; 6 N HCl/acetic acid 1:1).

(b) $N^\alpha$-*methyl-L-lysine.*—$N^\epsilon$-carbobenzoxy - $N^\alpha$-benzyl-L-lysine was reacted with formic acid and formaldehyde according to the procedure described in the previous examples, except that the reaction mixture was heated for only 30 minutes at 100°, and directly thereafter concentrated in vacuo. The resulting oil was thereafter hydrogenolyzed in a stream of hydrogen gas until no carbon dioxide was detectable in the effluent gas. After removal of the catalyst and concentration in vacuo, an oil was obtained which upon recrystallization from methanol/acetone gave in a yield of 82% (based on $N^\epsilon$-carbodenzoxy-$N^\alpha$-benzyl-L-lysine), $N^\alpha$-methyl-L-lysine, M.P. 240° (dec.) $[\alpha]_D^{22} = +30.7°$ (c.=1.0; 6 N HCl).

We claim:
1. A method for the preparation of optically active N-monomethylaminocarboxylic acids which comprises reaction in aqueous solution of a salt, formed from an optically active naturally occurring α-aminocarboxylic acid and a base selected from the group consisting of alkali metal hydroxides and alkaline earth metal hydroxides wtih a benzaldehyde, reduction with a complex metal hydride of the so-obtained N-benzylidene compound to the corresponding N-benzyl compound, methylation of the nitrogen of the benzylated amino group and finally hydrogenolysis to split off the N-benzyl group.

2. A method for the preparation of optically active N-monomethylaminocarboxylic acids which comprises reaction in aqueous solution of a salt, formed from an optically active naturally occurring α-aminocarboxylic acid and a base selected from the group consisting of alkali metal hydroxides and alkaline earth metal hydroxides with a benzaldehyde, reduction with catalytically activated hydrogen of the so-obtained N-benzylidene compound to the corresponding N-benzyl compound, methylation of the nitrogen of the benzylated amino group and finally hydrogenolysis to split off the N-benzyl group.

3. A method according to claim 2 wherein the N-benzyl compound is methylated by means of an agent selected from the group consisting of formaldehyde, methyl halide and dimethyl sulfate.

4. A method according to claim 2 which comprises using an alkali metal salt of an optically active naturally ocurring α-aminocarboxylic acid.

5. A method according to claim 1, which comprises using an alkali metal salt of an optically active naturally occurring α-aminocarboxylic acid.

6. A process according to claim 1 wherein the complex metal hydride is sodium borohydride.

7. A method according to claim 1, wherein the N-benzyl compound is methylated by means of formaldehyde in the presence of formic acid.

8. A method according to claim 1, wherein the N-benzyl compound is methylated by means of an agent selected from the group consisting of formaldehyde, methyl halide and dimethyl sulfate.

References Cited by the Examiner

UNITED STATES PATENTS

| | | | |
|---|---|---|---|
| 2,433,979 | 1/48 | Billman | 260—518 |
| 2,791,586 | 5/57 | Sletzinger et al. | 260—518 |

OTHER REFERENCES

Adams et al.: Organic Reactions, vol. VII, pp. 263–88 (1957).

Finar: Organic Chemistry, vol. 1, pp. 115 and 153 (1959).

LEON ZITVER, *Primary Examiner.*

CHARLES B. PARKER, *Examiner.*